United States Patent [19]
Yoda et al.

[11] Patent Number: 6,038,101
[45] Date of Patent: Mar. 14, 2000

[54] MAGNETIC HEAD AND METHOD OF MANUFACTURING MAGNETIC HEAD

[75] Inventors: Hiroaki Yoda, Kawasaki; Yuichi Ohsawa, Tokyo; Takeo Sakakubo; Masashi Sahashi, both of Yokohama; Jun Ito, Ome; Kazushi Tanimoto, Tokyo, all of Japan

[73] Assignee: Kabushiki Kaisha Toshiba, Kawasaki, Japan

[21] Appl. No.: 09/041,624

[22] Filed: Mar. 13, 1998

[30] Foreign Application Priority Data

Mar. 14, 1997 [JP] Japan ................................. 9-061478

[51] Int. Cl.[7] .............................. G11B 21/21; G11B 5/60
[52] U.S. Cl. ............................................................. 360/103
[58] Field of Search ...................................... 360/102, 103, 360/122

[56] References Cited

U.S. PATENT DOCUMENTS

| | | | |
|---|---|---|---|
| 5,544,774 | 8/1996 | Gray | 216/22 |
| 5,563,754 | 10/1996 | Gray et al. | 360/126 |
| 5,609,948 | 3/1997 | David et al. | 428/216 |
| 5,644,455 | 7/1997 | Schultz | 360/113 |
| 5,737,825 | 4/1998 | Gray et al. | 29/603.14 |
| 5,754,377 | 5/1998 | Gray et al. | 360/126 |
| 5,805,380 | 9/1998 | Ishihara et al. | 360/103 |
| 5,807,909 | 9/1998 | Gray et al. | 360/126 |
| 5,822,153 | 10/1998 | Lairson et al. | 360/104 |
| 5,863,450 | 1/1999 | Dutertre et al. | 216/27 |

FOREIGN PATENT DOCUMENTS

| | | |
|---|---|---|
| 56-083829 | 7/1981 | Japan . |
| 60-043214 | 3/1985 | Japan . |
| 62-033317 | 2/1987 | Japan . |
| 3-059813 | 3/1991 | Japan . |
| 5-182133 | 7/1993 | Japan . |
| 6-089411 | 3/1994 | Japan . |
| 7-282555 | 10/1995 | Japan . |
| 8-045045 | 2/1996 | Japan . |
| 8-153379 | 6/1996 | Japan . |
| 8-329450 | 12/1996 | Japan . |

OTHER PUBLICATIONS

John Sivertsen, et al., "Diamond–Like Carbon Films as Wear–Protective Coatings on Media and Head Sliders", Journal of the Magnetics Society of Japan, vol. 21, Supplement, No. S2 , 1997, pp. 89–94.

*Primary Examiner*—William J. Klimowicz
*Attorney, Agent, or Firm*—Oblon, Spivak, McClelland, Maier & Neustadt, P.C.

[57] ABSTRACT

A magnetic head has a recording/reproducing element which is embedded in an insulation layer made of an $AlO_x$ thin film and a leading end of which is positioned at a medium opposed face. A high-hardness coating layer or a high-thermal conductivity coating layer made of diamond-like carbon or the like is disposed on a peripheral region of the medium opposed face, excluding the leading end of the recording/reproducing element and a region in the neighborhood thereof. Even in the case where the magnetic head is applied to a magnetic disk apparatus of contact recording/reproducing system, it is possible to greatly restrain wear of the leading end of the recording/reproducing element and the region in the neighborhood thereof. Further, the heat dissipation characteristic of the leading end of the recording/reproducing element can be improved greatly. The dishing of the leading end of the recording/reproducing element can be reduced to a great extent by so etching the peripheral region of the medium opposed face that the leading end of the recording/reproducing element is projected; forming the high-hardness coating layer on an etched region; and processing the projected region by wear in a final process.

23 Claims, 14 Drawing Sheets

MAGNETIC HEAD AND METHOD OF MANUFACTURING MAGNETIC HEAD

BACKGROUND OF THE INVENTION

1. Field of the Invention

The present invention relates to a magnetic head for use in a magnetic recording apparatus such as a magnetic disk apparatus and a method of manufacturing the magnetic head.

2. Description of the Related Art

The conventional magnetic disk apparatus (HDD) has a magnetic head, as shown in FIG. 20. In the magnetic head 1 shown in FIG. 20, an $Al_2O_3/TiC$ substrate 2 constitutes a slider portion 3. An electromagnetic conversion element serving as a recording/reproducing element 5 is embedded inside an insulation layer made of a thin $AlO_x$ film 4 formed on a main surface side of the $Al_2O_3/Ti$ substrate 2. A trailing section 6 is constituted of the thin $AlO_x$ film 4 and the recording/reproducing element 5. A leading end 5a of the recording/reproducing element 5 is positioned on a medium opposed face 7 at the trailing section side.

In the conventional magnetic disk apparatus, the slider portion 3 of the magnetic head 1 is afloat over a surface of the magnetic disk by a pressure generated by the viscosity of air which flows rotatably according to the high-speed rotation of the magnetic disk. At this time, the leading end 5a of the recording/reproducing element 5 positioned on the medium opposed face 7 is spaced at a constant interval from the magnetic disk. The medium opposed face 7 of the trailing section 6 as well as the slider portion 3 are flying above the magnetic disk as an Air Bearing Surface (ABS).

In the conventional magnetic disk apparatus, the magnetic head 1 and the magnetic disk are not in sliding contact with each other while the magnetic disk apparatus is in operation. Thus, basically, a problem that the magnetic head 1 and the magnetic disk are worn does not occur.

The magnetic disk apparatus is demanded to have an improved magnetic recording density. In order to comply with the demand, the present tendency is to shorten the wavelength of a recording signal. But the shortening of the wavelength of the recording wavelength causes the output of the recording/reproducing element 5 to be reduced. In order to compensate the reduction in the output of the recording/reproducing element 5, it is necessary to decrease the flying height of the magnetic head 1 to further reduce the magnetic spacing between the leading end 5a of the recording/reproducing element 5 and the magnetic disk. In a magnetic recording density of 1~2 Gbpsi (Gbits/inch$^2$) currently adopted, the magnetic spacing between the magnetic head and the magnetic disk is 80~90 nm, whereas in a magnetic recording density of about 3 Gbpsi, it is necessary to reduce the magnetic spacing therebetween to 60~70 nm. In a magnetic recording density of as high as 10 Gbpsi, it is necessary to reduce the magnetic spacing therebetween to less than 30 nm.

In such a background, much efforts have been made to reduce the flying height of the magnetic head 1. The magnetic spacing between the leading end 5a of the recording/reproducing element 5 and the magnetic disk cannot be effectively reduced even though only the flying height of the head slider is reduced. That is, the magnetic spacing between the leading end 5a and the magnetic disk is determined by the total of the following elements (1) through (4):

(1) Thickness of protection film and lubricating layer at magnetic disk side
(2) Flying height of head slider
(3) Thickness of protection film of magnetic head
(4) Dishing amount of leading end 5a from the substrate ($Al_2O_3/TiC$ substrate 2 or thin $AlO_x$ film 4) of magnetic head.

Regarding the flying height of the head slider of item (2), as a result of efforts made so far, it is possible to allow the head slider to be closer and closer to the magnetic disk during the operation of the magnetic disk apparatus. Under these circumstances, regarding item (1), the thickness of protection film and lubricating layer at magnetic disk side cannot be minimized to zero because it is necessary to allow a stable rotation of the magnetic disk. Thus, item (4) is important. That is, it is important to reduce the dishing amount of the leading end 5a of the recording/reproducing element 5.

However, the medium opposed face (ABS) 7, of the magnetic head 1, on which the leading end 5a is positioned is abraded with diamond abrasive grain in its final process. Consequently, it necessarily occurs that the leading end 5a is dished more than the substrate of the magnetic head by 15~20 nm.

That is, the leading end 5a of the recording/reproducing element 5 is made of a metal material such as an Ni—Fe alloy, a Co magnetic alloy or the like each having a hardness lower than that of the $Al_2O_3/TiC$ substrate 2 or that of the thin $AlO_x$ film 4 as the undercoat and overcoat of the recording/reproducing element 5. Therefore, the leading end 5a is necessarily abraded deeper than the $Al_2O_3/TiC$ substrate 2 or the thin $AlO_x$ film 4 by 15~20 nm, based on the difference between the hardness of the Ni—Fe alloy or the Co magnetic alloy and that of the $Al_2O_3/TiC$ substrate 2 or that of the thin $AlO_x$ film 4, when the medium opposed face 7 is finally processed by means of abrasion. FIG. 21 is a view for describing the dishing at the leading end 5a of the recording/reproducing element 5. That is, FIG. 21 is a sectional view taken along a line A–A' of FIG. 20. A reference character "D" of FIG. 21 indicates the dishing amount of the leading end 5a. As apparent from the foregoing description, there is a limit in the reduction of the magnetic spacing between the magnetic head 1 and the magnetic disk.

As described above, including the above-described problem of the dishing, there is a limit in the reduction of the flying height of the magnetic head 1. In order to solve the problem, there has been developed a magnetic disk apparatus of contact recording/reproducing system for recording and reproducing signals by contacting the leading end 5a of the recording/reproducing element 5 with the magnetic disk. In this type of magnetic disk apparatus, it is important to prevent the abrasion of the magnetic head and the magnetic disk, because the magnetic head is always in sliding contact with the magnetic disk during its operation. To this end, a method of minimizing the pressing load of the magnetic head against the magnetic disc is adopted. But it is very difficult to prevent the magnetic head from being worn because the same portion thereof slidably always contacts the magnetic disk.

The present tendency is to apply a magnetoresistance effect element having a high sensitivity to compensate the track width decrease-caused reduction in the reproducing output of the recording/reproducing element 5. In the magnetic disk apparatus (HDD) in which the magnetic head is flying above the magnetic disk by utilizing the ABS, basically, the problem that the magnetic head contacts the magnetic disk does not occur, as described above.

Actually, the leading end of the recording/reproducing element contacts the recording medium because of a projection (called glide height) formed on the recording medium. The projection of the recording medium contacts the magnetic head at a greater force as the magnetic head flies at a shorter distance from the magnetic disk. The contact between the leading end of the recording/reproducing element and the recording medium results in the rise of the temperature of a specific portion of the magnetoresistance effect film of the recording/reproducing element, thus causing the output level of a signal-reproducing voltage to fluctuate and the deterioration (called thermal asperity) of the output waveform of a reading signal. Consequently, an error occurs.

In addition, resistance change-measuring sense current (~5 mA) causes the temperature of the magnetoresistance effect element to rise by about 40° C. Thus, under an environmental temperature of 80° C., the temperature of the magnetoresistance effect element will rise to 120~130° C. Such a temperature rise of the magnetoresistance effect element will cause interface diffusion of the magnetoresistance effect film to occur and the characteristic of a magnetic layer composing it to deteriorate with age.

As described above, with the improvement of the magnetic recording density, the adoption of the contact recording/reproducing system and the art of spacing the magnetic head at a shorter distance from the magnetic disk are investigated. In the conventional contact recording/reproducing system, the wear of the leading end of the recording/reproducing element and that of the thin $AlO_x$ film in the periphery thereof cannot be prevented. Thus, in order to put the contact recording/reproducing system into practical use, the improvement of the wear resistance of these portions is an important problem imposed on the contact recording/reproducing system. Further, in any of the above-described systems, the improvement of the output of the reproducing signal is prevented owing to the limit in the reduction of the magnetic spacing caused by the problem of the dishing of the leading end of the recording/reproducing element. Thus, the reduction in the large dishing amount of the leading end of the recording/reproducing element is demanded.

The magnetic head to which the magnetoresistance effect element is applied as the reproducing element has a problem that when the leading end of the recording/reproducing element and the recording medium contact each other, the temperature of the magnetoresistance effect film rises locally due to the projection formed on the surface of the recording medium. Therefore, there is a demand for the development of preventing the temperature rise of the magnetoresistance effect film to restrain the generation of the thermal asperity and the deterioration of the characteristic of magnetoresistance effect film.

SUMMARY OF THE INVENTION

Accordingly, it is an object of the present invention to provide a magnetic head in which wear of the leading end of a recording/reproducing element and that of a region in the neighborhood thereof can be restrained even though the magnetic head is applied to a magnetic disk apparatus of contact recording/reproducing system and provide a method of manufacturing the magnetic head. It is another object of the present invention to provide a magnetic head in which a magnetic space can be reduced by preferably dishing (abrading) the leading end of the recording/reproducing element and provide a method of manufacturing the magnetic head. It is still another object of the present invention to provide a magnetic head in which the generation of thermal asperity and deterioration of the characteristic of a magnetoresistance effect film can be restrained by preventing the temperature rise of a portion of a recording/reproducing element and provide a method of manufacturing the magnetic head.

A first magnetic head according to the present invention writes signals to a recording medium by a magnetic field and reads signals by a magnetic field generated by magnetic information of the recording medium, by bringing a medium opposed face into contact with the recording medium or by flying the medium opposed face above the recording medium. The magnetic head comprises an insulation layer having the medium opposed face; a recording/reproducing element which is embedded in the insulation layer and a leading end of which is positioned at the medium opposed face; and a high-hardness coating layer disposed on a peripheral region of the medium opposed face other than a region in the neighborhood of the leading end of the recording/reproducing element and having a hardness higher than a hardness of the insulation layer.

A second magnetic head according to the present invention writes signals to a recording medium by a magnetic field and reads signals by a magnetic field generated by magnetic information of the recording medium, by bringing a medium opposed face into contact with the recording medium or by flying the medium opposed face above the recording medium. The magnetic head comprises an insulation layer having the medium opposed face; a recording/reproducing element which is embedded in the insulation layer and a leading end of which is positioned at the medium opposed face; and a high-thermal conductivity coating layer disposed on a peripheral region of the medium opposed face other than a region in the neighborhood of the leading end of the recording/reproducing element and having a thermal conductivity higher than a thermal conductivity of the insulation layer.

In the magnetic head of the present invention, the high-hardness coating layer or the high-thermal conductivity coating layer is so positioned that the same plane is substantially formed of the leading end of the recording/reproducing element and the surface of the high-hardness coating layer or the high-thermal conductivity coating layer. Further, in the magnetic head of the present invention, an entire surface of the medium opposed face including the surface of the high-hardness coating layer or the high-thermal conductivity coating layer is coated with another high-hardness coating layer having a hardness higher than the hardness of the insulation layer or another high-thermal conductivity coating layer having a thermal conductivity higher than the thermal conductivity of the insulation layer.

In a method, of the present invention, of manufacturing a magnetic head for writing signals to a recording medium by a magnetic field and reading signals by a magnetic field generated by magnetic information of the recording medium, by bringing a medium opposed face into contact with the recording medium or by flying the medium opposed face above the recording medium, the improvement comprises the steps of embedding a recording/reproducing element in an insulation layer having the medium opposed face in so that a leading end of the recording/reproducing element is positioned at the medium opposed face; etching a peripheral region of the medium opposed face other than a region in the neighborhood of the leading end of the recording/reproducing element; and forming a high-hardness coating layer having a hardness higher than a hardness of the insulation layer or a high-thermal conductivity coating layer having a thermal conductivity higher than the thermal conductivity of the insulation layer on an etched portion.

According to a magnetic head-manufacturing method of the present invention, after a high-hardness coating layer or a high-thermal conductivity coating layer is so formed on an etched portion that the leading end of the recording/reproducing element and the region in the neighborhood thereof are projected, the leading end of the recording/reproducing element and the region in the neighborhood thereof are so processed by wear in a finishing operation that the medium opposed face is substantially plane.

In the first magnetic head of the present invention, the high-hardness coating layer is disposed on the peripheral region of the medium opposed face, other than the region in the neighborhood of the leading end of the recording/reproducing element. In other words, the greater part of the medium opposed face is formed of the high-hardness coating layer superior in sliding contact characteristic, namely, superior in wear resistance. Therefore, even in the case where the magnetic head is applied to the magnetic disk apparatus of contact recording/reproducing system, the wear of the leading end of the recording/reproducing element and that of the region in the neighborhood thereof can be reduced greatly.

In the second magnetic head of the present invention, the high-thermal conductivity coating layer is disposed on the peripheral region of the medium opposed face, excluding the region in the neighborhood of the leading end of the recording/reproducing element. Thus, the leading end of the recording/reproducing element is allowed to dissipate heat efficiently. Accordingly, even when the medium opposed face contacts a projection called "glide height" formed on the surface of the recording medium, heat generated by the contact therebetween is dissipated rapidly. Thus, it is possible to greatly reduce fluctuation so-called thermal asperity in the output level of a reproducing voltage by restraining the temperature of the atmosphere in the vicinity of the leading end of the recording/reproducing element. The improvement of the heat dissipation efficiency in the vicinity of the leading end of the recording/reproducing element contributes to the retard of the sense current-caused temperature rise of the magnetoresistance effect film.

Further, the high-hardness coating layer or the high-thermal conductivity coating layer is so positioned that the same plane is substantially formed of the leading end of the recording/reproducing element and the surface of the high-hardness coating layer or the high-thermal conductivity coating layer. Thus, when the magnetic head having a such a construction is applied to a magnetic disk apparatus of flying type and contact recording/reproducing type, the magnetic space between the leading end of the recording/reproducing element and the magnetic recording medium can be reduced. Such a construction of the magnetic head can be achieved by so etching the peripheral region of the leading end of the recording/reproducing element of the medium opposed face that the leading end of the recording/reproducing element and the region in the neighborhood thereof are projected; forming the coating layer on the etched portion; and processing the projected region by wear in a final process. The finish processing by wear prevents the dishing of the leading end of the recording/reproducing element.

When the medium opposed face including the surface of the high-hardness coating layer or that of the high-thermal conductivity coating layer is entirely coated with another coating layer, the leading end of the recording/reproducing element and the region in the neighborhood thereof can be allowed to have much improved wear resistance and heat dissipation characteristic.

These and other objects, features and advantages of the present invention will become more apparent in light of the following detailed description of a best mode embodiment thereof, as illustrated in the accompanying drawings.

DESCRIPTION OF THE PREFERRED EMBODIMENTS

Figure 1:
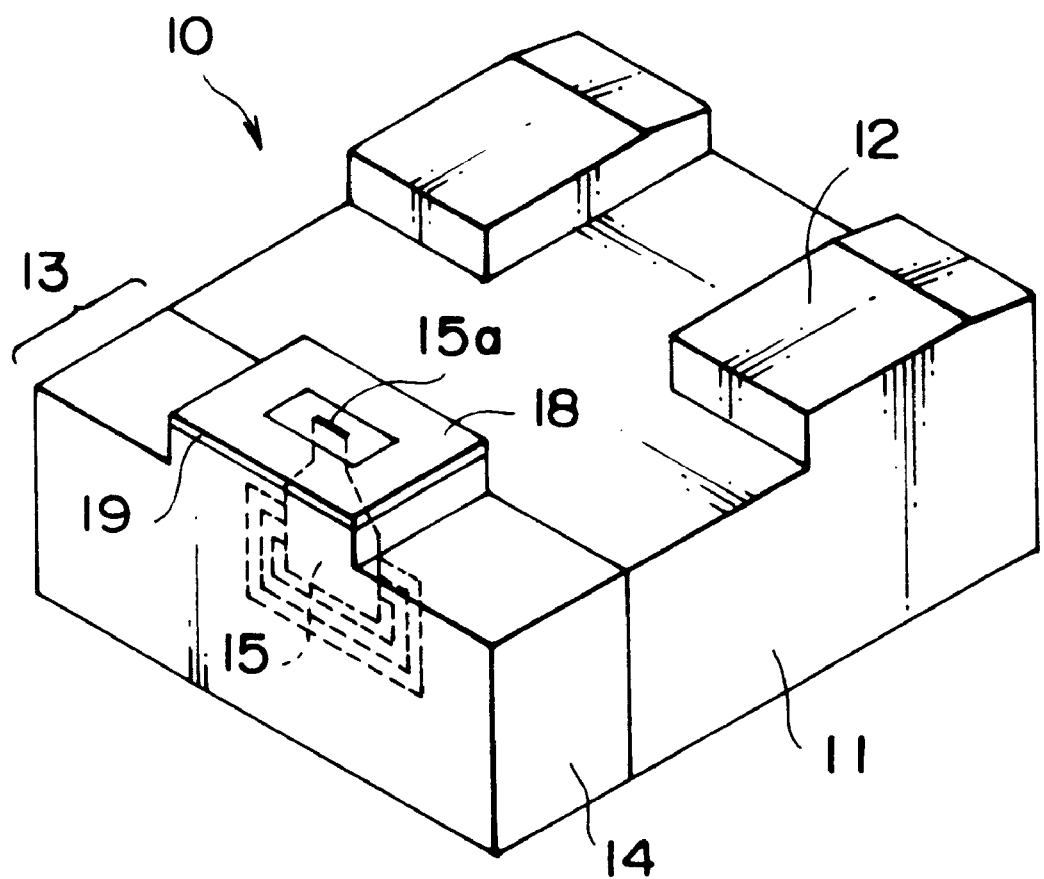
FIG. 1 is a perspective view showing a schematic construction of a magnetic head according to a first embodiment of the present invention.
Figure 2:
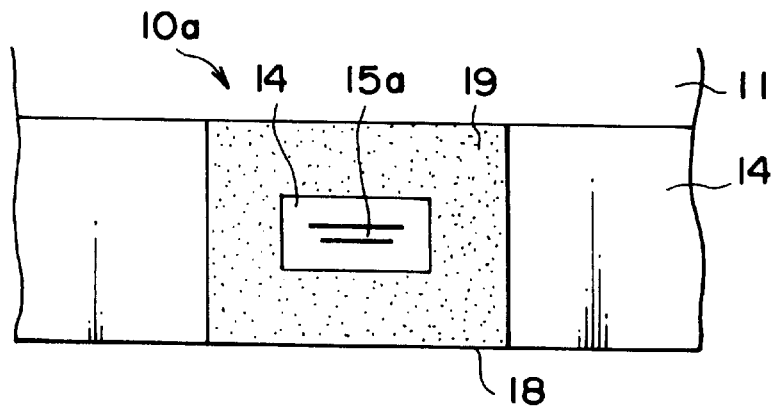
FIG. 2 is a plan view showing main parts of the magnetic head shown in FIG. 1.
Figure 3:
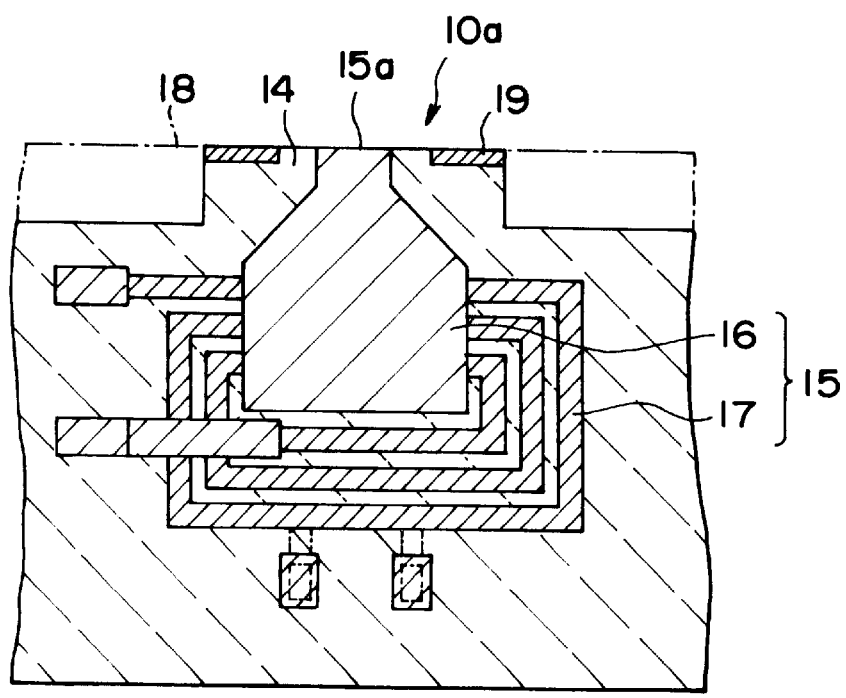
FIG. 3 is a sectional view showing internal constructions of the main parts of the magnetic head shown in FIG. 1.

FIGS. 1, 2, and 3 are views showing the construction of a magnetic head according to a first embodiment of the present invention. FIG. 2 is a plan view showing a trailing section when it is observed from a recording medium side. FIG. 3 is a sectional view showing the internal construction of the trailing section.

As shown in FIGS. 1 through 3, a magnetic head 10 has a slider portion 12 formed of an $Al_2O_3$/TiC substrate 11. An insulation layer consisting of a thin $AlO_x$ film 14 constituting a trailing section 13 is formed at an end of the $Al_2O_3$TiC substrate 11. The trailing section 13 is formed of only the thin $AlO_x$ film 14 as the undercoat and the overcoat. The insulation layer may be formed of an insulating material of $SiO_x$, $SiN_x$ or the like.

The thin $AlO_x$ film 14 has an electromagnetic conversion element serving as a recording/reproducing element 15 embedded therein. The recording/reproducing element 15 may be formed of a magnetic head thin film element of induction type. But it is preferable to use a separate recording/reproducing type magnetic head element formed by laminating the magnetoresistance effect element serving as a reproducing element and the magnetic head thin film element of induction type serving as a recording element. Such the separate recording/reproducing type magnetic head element having the magnetoresistance effect element allows the output of a reproducing signal at a high sensitivity.

As the magnetoresistance effect element, the following films are used: An anisotropic magnetoresistance effect film (AMR film) whose electric resistance changes according to an angle formed between the direction of electric current and a magnetizing moment of a magnetic layer; and a giant magnetoresistance effect film (GMR film) such as a spin valve film, an artificial lattice film or the like which has a laminated structure of a magnetic layer and a nonmagnetic layer and whose electric resistance changes according to an angle formed between the magnetization of the magnetic layers. $Ni_{80}Fe_{20}$ or the like is used as the material to compose the AMR film. A laminated film of $Co_{90}Fe_{10}$ film/Cu film/$Co_{90}Fe_{10}$ film or the like is used as the spin valve film. In the spin valve film, an anti-ferromagnetic film made of FeMn, IrMn or the like is positioned adjacently to the $Co_{90}Fe_{10}$ film.

The recording/reproducing element 15 is mainly formed of a magnetic metal material such as a Ni—Fe alloy, FeN, a Co magnetic alloy, an amorphous alloy of CoZrNb. FIG. 3 mainly shows the magnetic head thin film element of induction type of the recording/reproducing element 15. The recording/reproducing element 15 comprises a magnetic pole made of a soft magnetic material such as the Ni—Fe alloy, the FeN or the amorphous CoZrNb alloy and a coil 17.

The recording/reproducing element 15 formed of the above-described magnetic metal material is embedded in the thin $AlO_x$ film 14. The leading end 15a of the recording/reproducing element 15 functioning as a recording track and a reproducing track is positioned at a medium opposed face 18 of the trailing section 13. Thus, in the medium opposed face 18, an insulating material (14) such as the $AlO_x$ is present in the neighborhood of the leading end 15a.

In the medium opposed face 18 in which the leading end 15a of the recording/reproducing element 15 is positioned, a coating layer 19 having a high hardness and a high thermal conductivity is disposed in the region other than the leading end 15a and the region made of the $AlO_x$ in the neighborhood of the leading end 15a. That is, the greater part of the medium opposed face 18 is formed of the coating layer 19 having a high hardness and a high thermal conductivity. More specifically, it is preferable that 98% or more of the area of the medium opposed face 18 is formed of the coating layer 19 having a high hardness and a high thermal conductivity.

"The coating layer having a high hardness" described above means a layer having a hardness $H_2$ higher than the hardness $H_1$ of the insulating layer formed of the thin $AlO_x$ film 14 ($H_2 > H_1$). "The coating layer having a high thermal conductivity" described above means a layer having a thermal conductivity $\alpha_2$ higher than the thermal conductivity $\alpha_1$ of the insulating layer formed of the thin $AlO_x$ film 14 ($\alpha_2 > \alpha_1$) The coating layer 19 is required to have a characteristic that its hardness $H_2$ satisfies $H_{2>H1}$ and/or a characteristic that its thermal conductivity $\alpha_2$ satisfies $\alpha_2 > \alpha_1$. As will be described later, it is preferable that the coating layer 19 satisfies both characteristics to restrain the wear (wear speed) and reduce the generation of the thermal asperity.

From the viewpoint of the restraint of the wear of the medium opposed face 18, the coating layer 19 is formed of a thin film having a high hardness. More specifically, it is preferable that the coating layer 19 is made of a thin film having a Vickers hardness of 800 Hv or more, because the thin $AlO_x$ film 14 has a Vickers hardness of about 800 Hv. As the thin films satisfying the above condition, the following thin films can be preferably used: diamond-like carbon (DLC) thin film (Vickers hardness: 3000~7000 Hv), aluminum nitride thin film (Vickers hardness: 1000~1100 Hv), silicon nitride thin film (Vickers hardness: 1000~1200 Hv), silicon carbide thin film (Vickers hardness: 1000~1300 Hv), and zirconium oxide (Vickers hardness: 800~1200 Hv).

From the viewpoint of increasing the dissipation of the region in the vicinity of the leading end 15a of the recording/reproducing element 15, the coating layer 19 is formed of a thin film having a high thermal conductivity. More specifically, it is preferable that the coating layer 19 is made of a thin film having a thermal conductivity of 20 W/m K or more, because the thin $AlO_x$ film 14 has a thermal conductivity of about 20 W/m K. As the thin films satisfying the above condition, the following thin films can be preferably used: diamond-like carbon (DLC) thin film (thermal conductivity: 40~400 W/m K), aluminum nitride thin film (thermal conductivity: 40~100 W/m K), silicon nitride thin film (thermal conductivity: 30~80 W/m K), and silicon carbide thin film (thermal conductivity: 40~150 W/m K).

Figure 4:
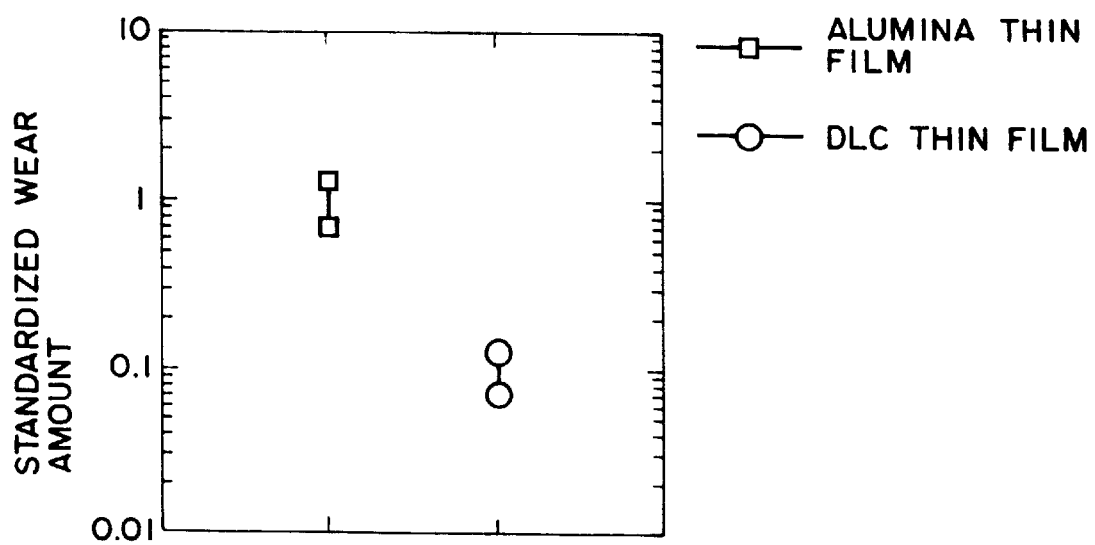
FIG. 4 is a view showing the wear amount of a diamond-like carbon thin film in comparison with the wear amount of an alumina thin film.

The thin DLC film 19 is more favorable than the other thin films because it has the hardness and the thermal conductivity higher than the hardnesses and the thermal conductivities of the other thin films. FIG. 4 is a view showing the wear resistance of the thin DLC film in comparison with that of the thin $AlO_x$ film 14 forming the insulating layer (14). As indicated in FIG. 4, the thin DLC film has a wear resistance higher than the thin $AlO_x$ film 14. In addition to the thin DLC film, the aluminum nitride thin film, the silicon nitride thin film, and the silicon carbide thin film can be preferably used as the material of the coating layer 19.

When the peripheral region of the medium opposed face 18 is formed of the coating layer 19 having the high hardness, excluding the leading end 15a and the region in the neighborhood thereof, the greater part of the sliding-contact region of the medium opposed face 18 is formed of the wear-resistant coating layer 19 having the high hardness. Accordingly, when the magnetic head 10 is used for the magnetic disk apparatus of the contact recording/reproducing system, it is possible to greatly reduce the wear of the medium opposed face 18.

In addition to the above advantage, it is possible to allow the leading end 15a of the recording/reproducing element 15 to dissipate heat at a high efficiency by forming the peripheral region of the medium opposed face 18 of the coating layer 19 having the high hardness, excluding the leading end 15a and the region in the neighborhood thereof. For example, when the medium opposed face 18 contacts a projection called "glide height" formed on the surface of the recording medium, heat generated by the contact therebetween is dissipated rapidly. Thus, it is possible to greatly reduce fluctuation so-called thermal asperity in the output level of a reproducing voltage by restraining the temperature of the atmosphere in the vicinity of the leading end 15a. The improvement of the heat dissipation efficiency in the vicinity of the leading end 15a contributes to the retard of the sense current-caused temperature rise of the magnetoresistance effect film, thus restraining the deterioration of the characteristic of the magnetoresistance effect film.

The magnetic head 10 of the first embodiment is applicable to a magnetic disk apparatus of flying system as well as a magnetic disk apparatus of the contact recording/reproducing system. That is, the magnetic head 10 may have the medium opposed face 18 functioning as the ABS (Air Bearing Surface). In the magnetic disk apparatus having a magnetic head whose the flying height of the magnetic head is very short, there is a high possibility that the magnetic head 10 and the magnetic disc contact each other. Accordingly, the use of the magnetic head 10 of the first embodiment is advantageous because the coating layer 19 having the high hardness and the high heat conductivity contributes to the restraint of the wear of the medium opposed face 18 and the improvement of the heat dissipation greatly. The magnetic heads of the embodiments which will be described later have a function similar to that of the magnetic head 10 of the first embodiment.

The construction of the magnetic head in which the coating layer 19 having the high hardness and the high thermal conductivity is formed in only the peripheral region of the medium opposed face 18 is manufactured as will be described below.

That is, initially, the medium opposed face 18 is processed by a normal mechanical abrasion into a substantially final element height or a final throat height. Then, the peripheral region of the thin $AlO_x$ film 14 forming the medium opposed face 18 is etched down, with the leading end 15a and the region in the neighborhood thereof unetched. Then, the coating layer 19 made of the thin DLC film or the like having the high hardness and thermal conductivity is selectively formed on only the etched portion. In this manner, the magnetic head having the above construction is constructed.

In the magnetic head 10 shown in FIGS. 2 and 3, in the medium opposed face 18, the coating layer 19 is positioned such that the coating layer 19, the leading end 15a, and the region in the neighborhood thereof substantially form the same plane, i.e., they are flush with each other. When the magnetic head 10 having the construction is used for the magnetic disk apparatus of the contact recording/reproducing system, the magnetic material which is the main material of the recording/reproducing element 15 and the thin $AlO_x$ film 14 slidably contact the magnetic recording medium such as the magnetic disk, and the coating layer 19 having a high degree of wear resistance slidably contacts the magnetic recording medium at the same time. Therefore, although the magnetic material and thin $AlO_x$ film 14 are made of the material which is worn readily, the medium opposed face 18 wears slowly because the coating layer 19 slidably contact the magnetic recording medium at the same time. Thus, the wear of the medium opposed face 18 can be restrained to a minimum degree.

A magnetic head not affected in its the signal recording/reproducing characteristic can be provided by the construction in which the same plane is substantially formed of the leading end 15a, the region in the neighborhood thereof, and the coating layer 19 having the high hardness and the high thermal conductivity, when the leading end 15a is worn slightly. Such a construction of the magnetic head can be achieved by forming the coating layer 19 in substantially the same height as that of the leading end 15a and the region in the neighborhood thereof in selectively forming the coating layer 19 on the etched portion.

Figure 5:
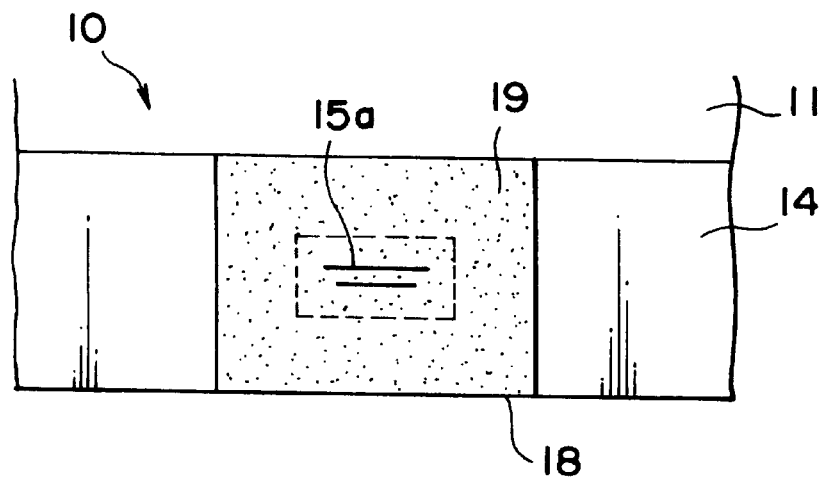
FIG. 5 is a main portions-depicted plan view showing a state in which a coating layer is formed in the magnetic head shown in FIG. 1.
Figure 6:
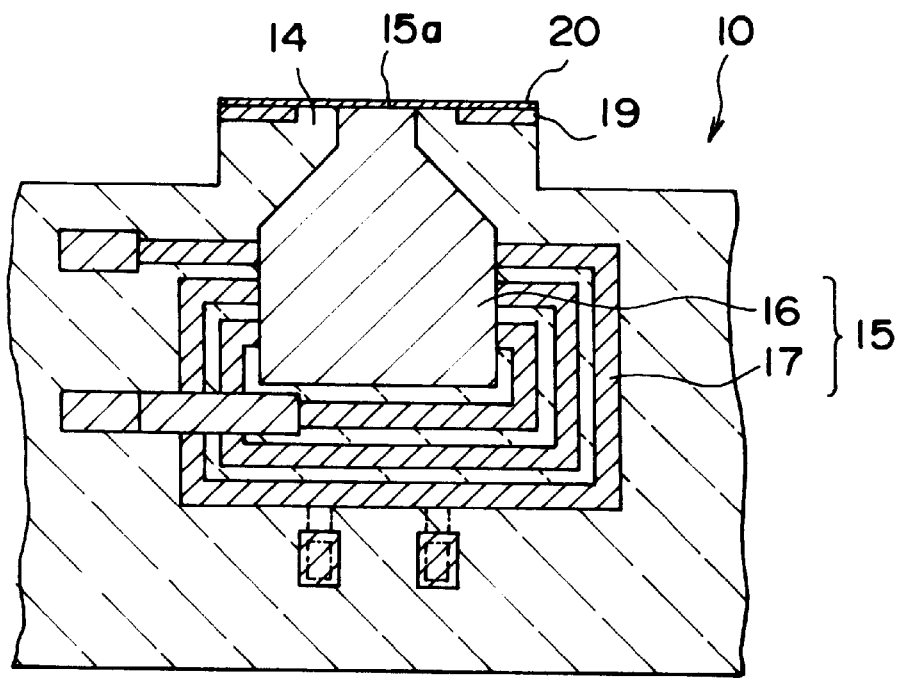
FIG. 6 is a sectional view showing the internal construction of the magnetic head shown in FIG. 5.

In order to further restrain the wear of the leading end 15a of the recording/reproducing element 15, a coating layer 20 (second coating layer) having a high hardness and a high thermal conductivity may be formed on the entire surface of the medium opposed face 18 as well as the entire surface of the coating layer 19 made of the film of DLC or the like, as shown in FIGS. 5 and 6.

According to such a construction of the magnetic head, the degree of wear of the medium opposed face 18 can be reduced greatly because the sliding contact surface thereof is entirely covered with the coating layer 20. Further, the coating layer 19 is formed in the peripheral region of the medium opposed face 18 in advance as the coating layer having the high hardness and the high thermal conductivity, the sliding contact characteristic of the medium opposed face 18 can be enhanced sufficiently even though the thickness of the second coating layer 20 is slight. Thus, the thickness of the second coating layer 20 formed on the leading end 15a is so slight that it does not increase the magnetic spacing between the magnetic head and the magnetic recording medium. It is preferable that the thickness of the first coating layer 19 is set to about 300 nm and that of the second coating layer 20 is set to about 5 nm. The second coating layer 20 contributes to the improvement of heat dissipation in the vicinity of the leading end 15a.

Figure 7A:
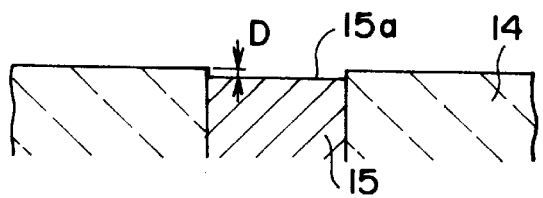
FIG. 7A, FIG. 7B, FIG. 7C, FIG. 7D, FIG. 7E, FIG. 7F are views showing an example of the manufacturing process of the magnetic head shown in FIG. 1.

Referring to FIG. 7A, when the medium opposed face 18 is processed by an ordinary mechanical abrasion at the first stage of the above-described manufacturing process of the magnetic head 10, the leading end 15a is dished (abraded) with about 15~20 nm than the thin $AlO_x$ film 14 positioned in the neighborhood thereof and the $Al_2O_3$/TiC substrate 11, because the leading end 15a has the hardness lower than that of the thin $AlO_x$ film 14 and the $Al_2O_3$/TiC substrate 11, as shown in FIG. 7A. The dishing amount (D) increases the magnetic spacing between the magnetic head 10 and the magnetic disk, thus deteriorating the output of the recording/reproducing signal. Thus, it is preferable to minimize the dishing amount (D).

In order to prevent the dishing amount (D) from increasing the magnetic spacing between the magnetic head 10 and the magnetic disk, it is preferable to construct the magnetic head 10 in a manufacturing process which will be described below. That is, as shown in FIG. 7A, the medium opposed face 18 is processed by a normal mechanical abrasion.

Figure 7B:
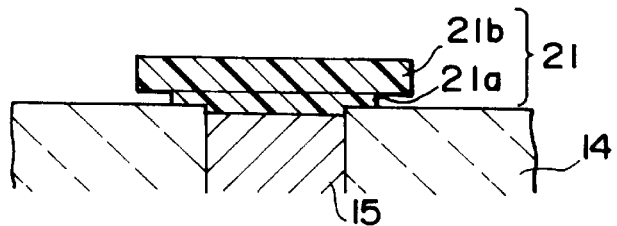

Then, as shown in FIG. 7B, a two-layer (upper layer 21b and lower layer 21a) T-shaped resist 21 having eaves formed thereon is applied to the medium opposed face 18.

It is indispensable to coat the leading end 15a with the T-shaped resist 21. But practically, the thin $AlO_x$ film 14 positioned in the neighborhood of the leading end 15a is coated with the T-shaped resist 21. At this time, the lower layer 21a is coated in a thickness of about 0.5 μm, and the eaves (projected portion) of the upper layer 21b is coated in a width of about 0.5 μm.

Figure 7C:
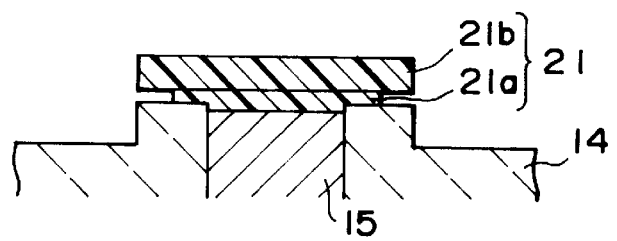

Then, as shown in FIG. 7C, the entire medium opposed face 18 is etched in a thickness of about 0.2 μm by ion beams or the like. The region of the medium opposed face 18 not covered with the T-shaped resist 21, namely, the peripheral region of the thin $AlO_x$ film 14 other than the neighborhood of the leading end 15a is so etched that the region is positioned below the leading end 15a. In other words, the medium opposed face 18 is so etched as to project the leading end 15a and the region in the vicinity thereof.

Figure 7D:
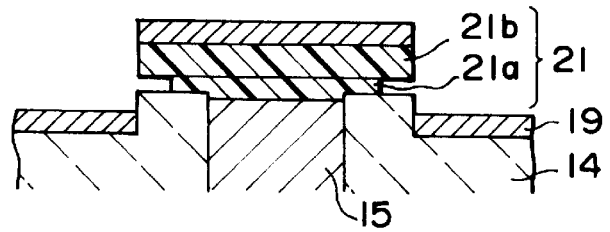
Figure 7E:
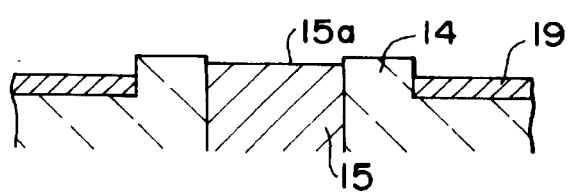

Then, as shown in FIG. 7D, the coating layer 19 made of the thin DLC film or the like is formed in a thickness of about 0.1 µm on the etched portion, without removing the T-shaped resist 21. Then, the T-shaped resist 21 is removed, and the thin DLC film on the T-shaped resist 21 is lifted off. At this time, it is necessary to so adjust the etching depth and the thickness of the thin DLC film that the surface of the thin DLC film is located below the leading end 15a, as shown in FIG. 7E.

Figure 7F:
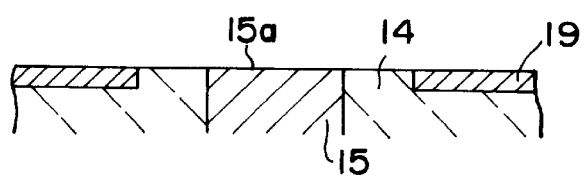

Thereafter, the leading end 15a and the neighborhood thereof projecting from the surface of the coating layer 19 made of the thin DLC film or the like are subjected to surface finish processing (final processing) which is performed by wear. The surface of the medium opposed face 18 can be smoothed by the finish processing by wear, as shown in FIG. 7F.

"The processing by wear" means a method of wearing a to-be-processed portion (the leading end 15a and the region in the neighborhood thereof) by pressing the plane DLC film against the to-be-processed portion, using a processing disk whose entire surface is covered with DLC. In abrasion of the to-be-processed portion by means of diamond abrasive grain generally used, a soft portion of a material is abraded more than a hard portion thereof. Hence, dishing occurs. Different from such an abrasion which is performed by using the conventional abrasive grain, according to the processing which is performed by contacting the DLC film with the to-be-processed portion, only the soft portion is worn slowly. That is, it does not occur that the soft portion is ground more than the hard portion.

As described above, the dishing amount of the leading end 15a of the recording/reproducing element 15 can be allowed to be close to zero by forming the coating layer 19 having the high hardness in the leading end 15a and the neighborhood thereof in advance such that the leading end 15a and the neighborhood thereof project and by wearing the projected leading end 15a and the neighborhood thereof into the final shape. That is, the medium opposed face 18 can be so smoothed as to allow the leading end 15a, the thin $AlO_x$ film 14 in the neighborhood thereof, and the thin coating layer 19 to form the same plane, which means that the magnetic spacing between the leading end 15a and the magnetic disk can be allowed to be almost zero. That is, the magnetic head manufactured by the method of the first embodiment is applicable to the magnetic disk apparatus of flying type and the contact type.

In the magnetic head 10 of the first embodiment, the region, of the medium opposed face 18, at the side of the trailing section 13 is formed of only the thin $AlO_x$ film 14. Thus, the dishing amount of the leading end 15a in the early state of the abrasion can be allowed to be small because the $Al_2O_3$/TiC substrate 11 having the highest hardness does not affect the dishing of the leading end 15a in the early state of the abrasion, which facilitates the processing operation in the subsequent process.

The magnetic head 10 shown in FIGS. 5 and 6 can be obtained by forming the second coating layer 20 on the medium opposed face 18 after the final processing shown in FIG. 7F finishes.

Figure 8A:
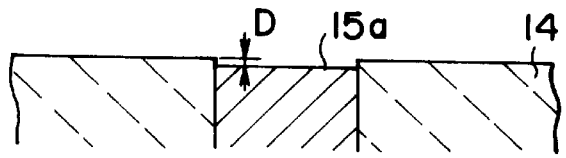
FIG. 8A, FIG. 8B, FIG. 8C, FIG. 8D, FIG. 8E, FIG. 8F are views showing another example of the manufacturing process of the magnetic head shown in FIG. 1.
Figure 8B:
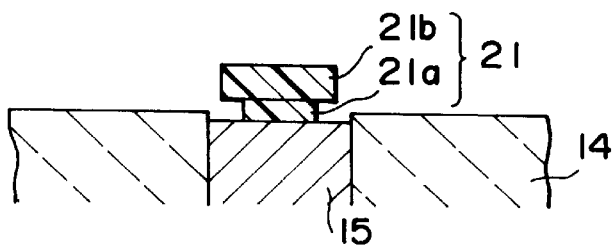
Figure 8C:
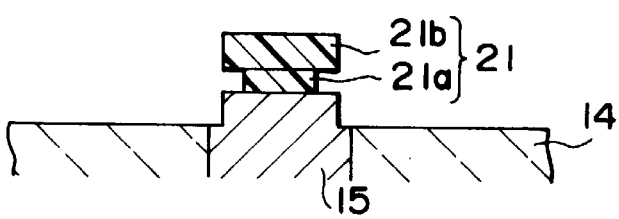
Figure 8D:
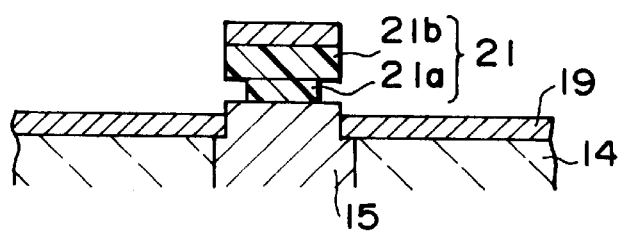
Figure 8E:
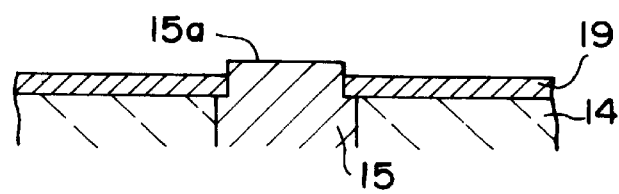

FIGS. 8A through 8F show the case in which the T-shaped resist 21 is formed to cover only the leading end 15a. That is, the T-shaped resist 21 is applied to the thin $AlO_x$ film 14 serving as the undercoat and the overcoat of the recording/reproducing element 15. As shown in FIG. 8B, the T-shaped resist 21 is so formed as to cover only the leading end 15a. Then, as shown in FIG. 8C, the thin $AlO_x$ film 14 is so etched as to project the leading end 15a from the thin $AlO_x$ film 14. After the coating layer 19 made of the thin DLC film is formed on the etched portion, as shown in FIG. 8D, the thin DLC film on the resist 21 is lifted off, as shown in FIG. 8E.

Figure 8F:
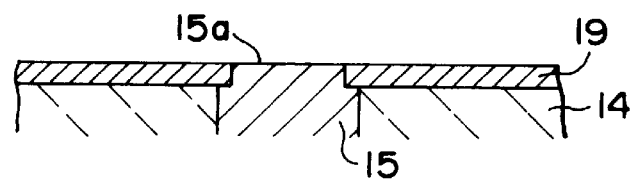

As described above, by so forming the T-shaped resist 21 as to cover only the leading end 15a, the surface which is to be abraded in the final processing stage consists of the magnetic material which composes the leading end 15a and which can be abraded uniformly, as shown in FIG. 8E. Therefore, the final processing which is to be carried out by abrasion can be accomplished easily, as shown in FIG. 8F.

It is to be noted that when the area coated with the T-shaped resist 21 is smaller than that of the leading end 15a of the recording/reproducing element 15, the leading end 15a is shaped according to the shape of the T-shaped resist 21, as shown in FIG. 8C. Thus, it is necessary to enhance the shape accuracy of the T-shaped resist 21 sufficiently.

In the magnetic head 10 of the first embodiment, the shape of the medium opposed face 18 at the trailing section side is not limited to that shown in FIG. 1. For example, as shown in FIGS. 9 and 10, it is possible to form a coating layer-unformed region on the medium opposed face 18 by masking a part of the medium opposed face 18, before forming thereon the coating layer 19 having the high hardness and the high thermal conductivity.

Figure 9:
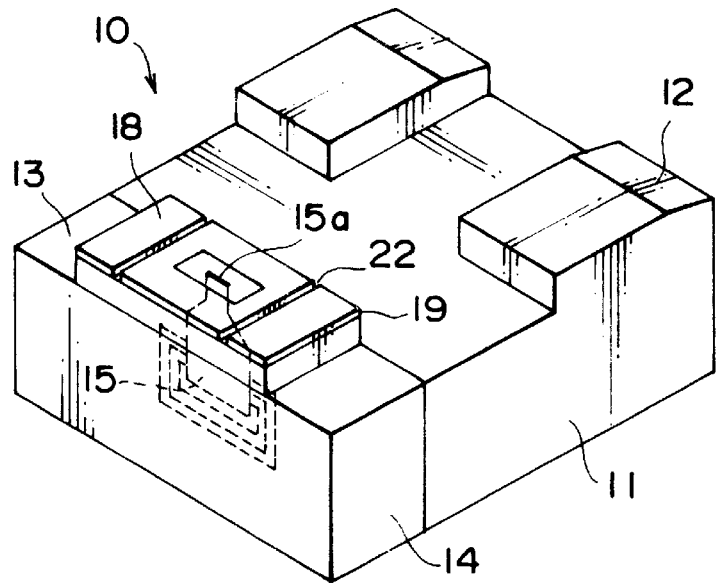
FIG. 9 is a perspective view showing a first modification of the magnetic head shown in FIG. 1.
Figure 10:
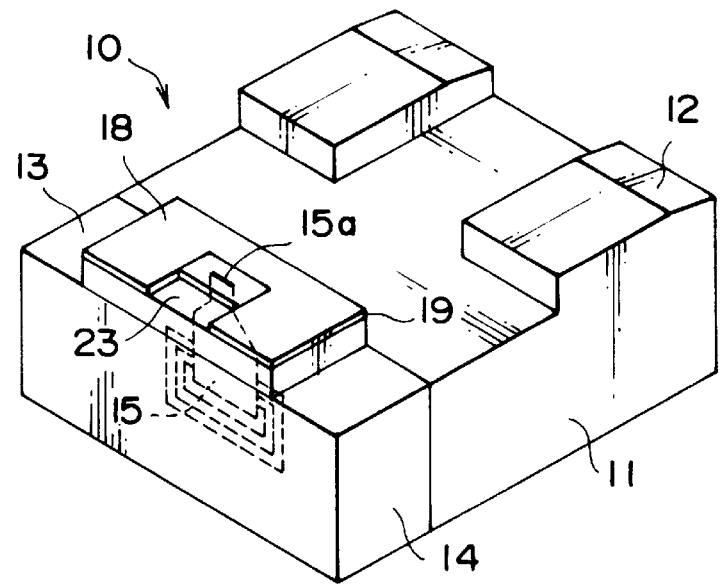
FIG. 10 is a perspective view showing a second modification of the magnetic head shown in FIG. 1.

In a first modification, shown in FIG. 9, of the magnetic head 10, a groove 22 is formed on the medium opposed face 18 along the direction in which the magnetic head 10 slidably contacts the magnetic disk. The construction maintains the contact between the medium opposed face 18 and the magnetic disk stably by adjusting the floating force which is applied to the magnetic head 10 and reduces wear of the medium opposed face 18. In a second modification, shown in FIG. 10, of the magnetic head 10, a stepped portion 23 is so formed on the medium opposed face 18 that it is positioned rearward from the recording/reproducing element 15. The construction allows a desired degree of a negative pressure to be generated in the rear of the recording/reproducing element 15 by adjusting the depth and width of the stepped portion 23 appropriately. Consequently, the medium opposed face 18 is capable of contacting the magnetic disk more stably, and abrasion-caused powder can be efficiently discharged from the medium opposed face 18.

Figure 11:
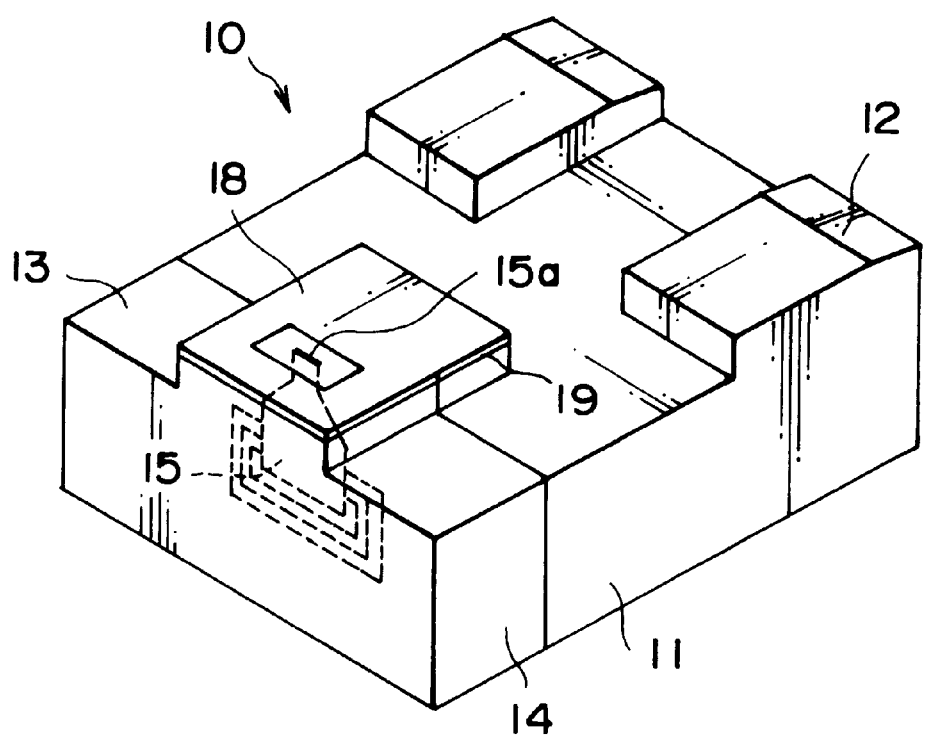
FIG. 11 is a perspective view showing a third modification of the magnetic head shown in FIG. 1.

The medium opposed face 18 does not necessarily consist of the thin $AlO_x$ film 14. The medium opposed face 18 may be partly formed of an $Al_2O_3$/TiC substrate 11, as shown in FIG. 11. The construction allows the medium opposed face 18 to contact the magnetic disk in a wider area, thus reducing the pressure which is applied to the surface of the medium opposed face 18 in the vicinity of the leading end 15a.

Figure 12:
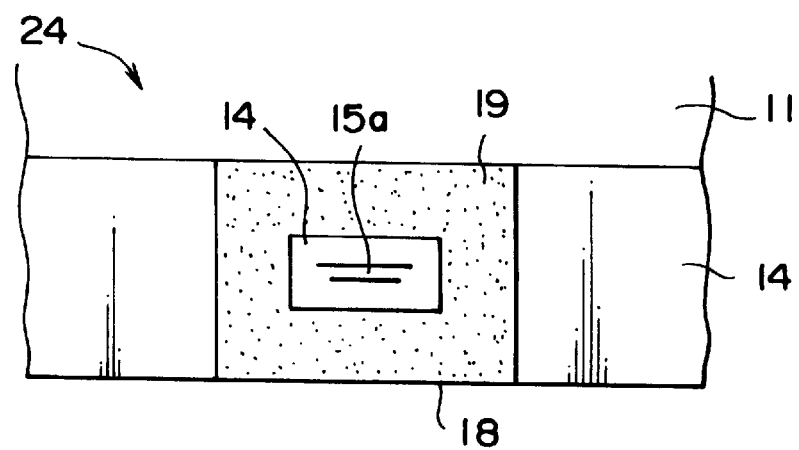
FIG. 12 is a plan view showing main parts of a magnetic head according to a second embodiment of the present invention.
Figure 13:
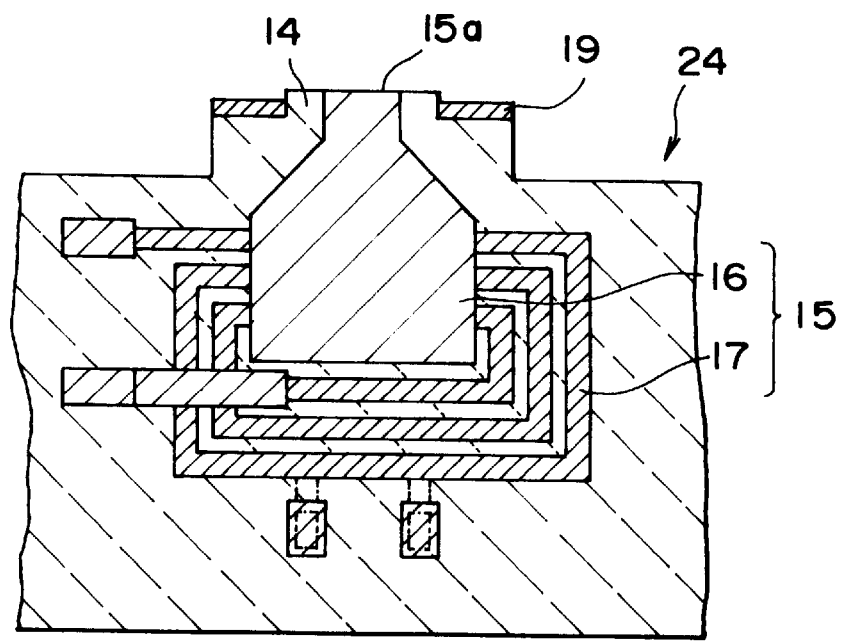
FIG. 13 is a sectional view showing the internal construction of the magnetic head shown in FIG. 12.

The magnetic head 10 of the first embodiment has the construction in which the surface of the leading end 15a, that of the region in the neighborhood thereof, and that of the coating layer 19 having the high hardness and thermal conductivity forms the substantially the same plane (substantially flush with each other). The magnetic head of the present invention is not limited to this construction. The magnetic head of the second embodiment of the present invention will be described below with reference to FIGS. 12, 13, and 14. FIG. 12 is a plan view showing the trailing section of a magnetic head of the second embodiment when it is viewed from the recording medium side. FIG. 13 is a sectional view showing the internal construction of the magnetic head shown in FIG. 12.

The essential construction of a magnetic head 24 shown in FIGS. 12 and 13 is similar to that of the magnetic head 10 of the first embodiment, except that the leading end 15a of the recording/reproducing element 15 and the region in the neighborhood thereof project slightly from the surface of the coating layer 19 made of the thin DLC film or the like.

When the magnetic head 24 is used for the magnetic disk apparatus of the contact recording/reproducing system, the magnetic material which is the main component of the recording/reproducing element 15 and the thin $AlO_x$ film 14 are worn faster than the coating layer 19 and only the projected portion of the magnetic head 24 slidably contacts the magnetic disk. Thus, a high pressure is applied to the surface of the projected portion by the magnetic disk. When the magnetic head 24 and the magnetic disk slidably contact each other during the operation of the magnetic disk apparatus, only the projected portion is selectively worn.

When the projected leading end 15a and the region in the vicinity thereof become worn to such an extent that the surface thereof is substantially flush with each other, the coating layer 19 and the magnetic disk start to slidably contact each other. Consequently, the area of the contact between the magnetic head 24 and the magnetic disk increases and the pressure is decreasingly applied to the projected leading end 15a and the region in the vicinity thereof. The coating layer 19 made of the thin DLC film or the like is resistant to abrasion. Thus, after the leading end 15a and the region in the vicinity thereof become worn to such an extent that the surface thereof is substantially flush with the surface of the coating layer 19, the wear speed thereof is reduced greatly.

The construction of the magnetic head in which the leading end 15a and the region in the vicinity thereof project slightly from the surface of the coating layer 19 can be preferably used as a magnetic head which is not affected in the magnetic characteristic thereof even though the leading end 15a has a comparatively high wear speed.

Such a construction of the magnetic head can be achieved as follows:

Similarly to the first embodiment, excluding the leading end 15a and the region in the vicinity thereof, initially, the peripheral region of the thin $AlO_x$ film 14 composing the medium opposed face 18 is etched. Then, the coating layer 19 is so formed that the leading end 15a and the region in the vicinity thereof project slightly from the surface of the coating layer 19 in selectively forming the coating layer 19 made of the thin DLC film or the like on the etched portion. That is, the magnetic head 24 having the above-described construction can be obtained by performing the manufacturing processes shown in FIGS. 7A through 7E.

Figure 14:
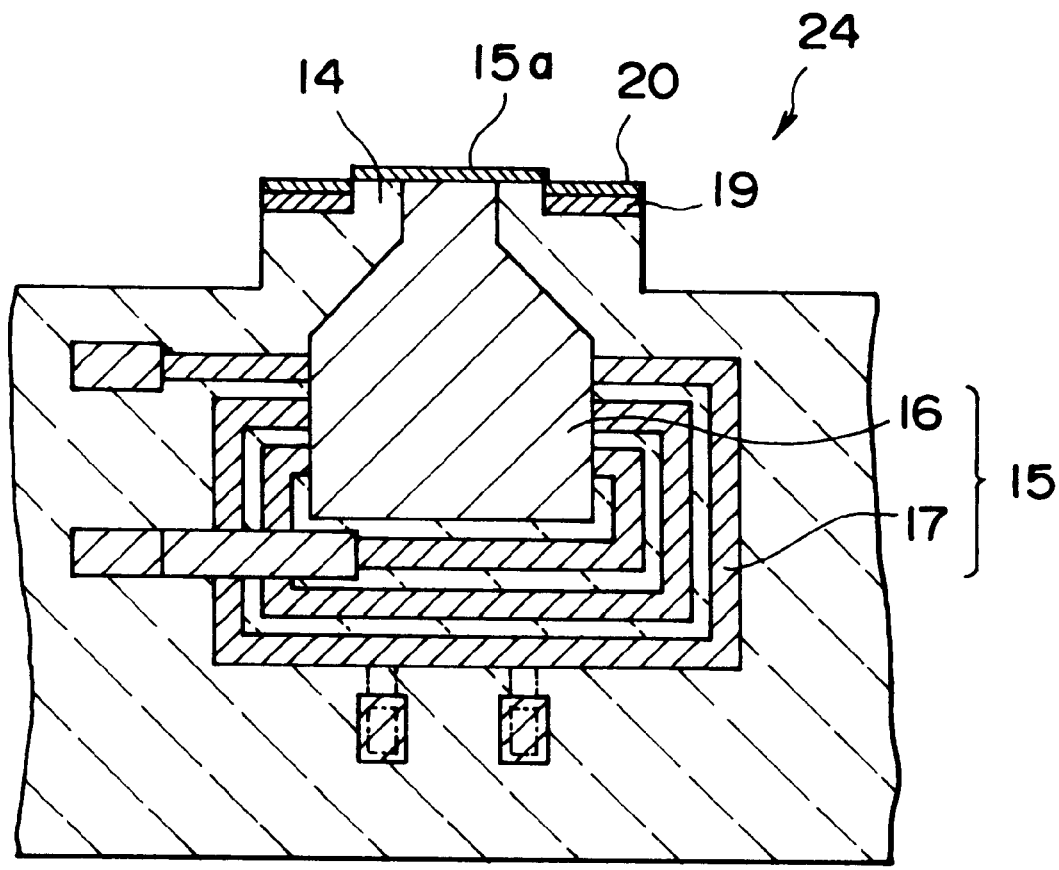
FIG. 14 is a sectional view showing a state in which a second coating layer is formed in the magnetic head shown in FIG. 12.

In the construction of the magnetic head in which the leading end 15a and the region in the vicinity thereof project slightly from the surface of the coating layer 19, the second coating layer 20 can be formed on the coating layer 19, as shown in FIG. 14.

The magnetic head of the third embodiment of the present invention will be described below with reference to FIGS. 15 through 18.

Figure 15:
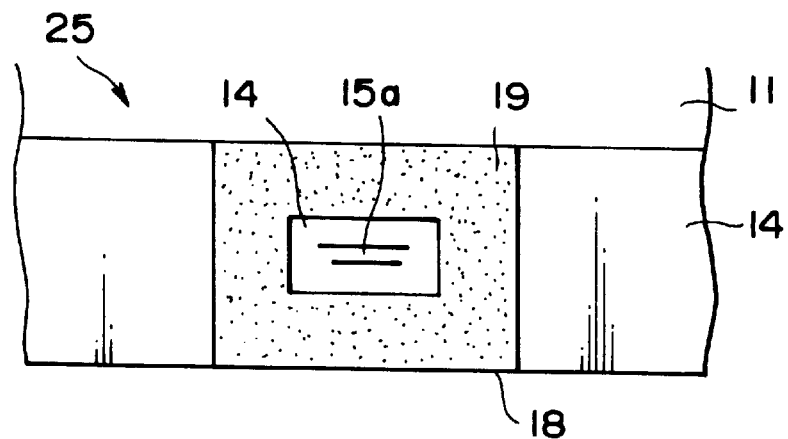
FIG. 15 is a plan view showing main parts of a magnetic head according to a third embodiment of the present invention.
Figure 16:
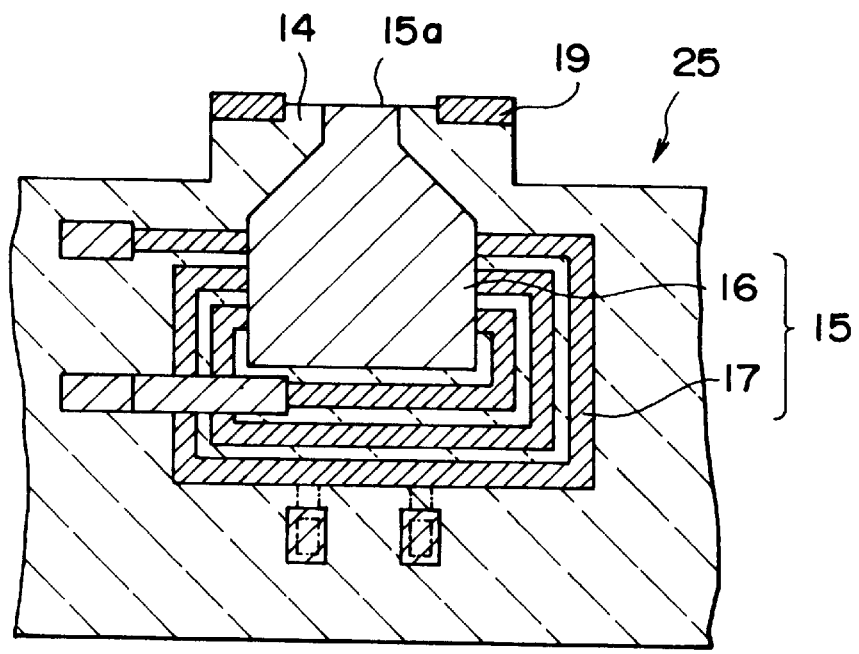
FIG. 16 is a sectional view showing the internal construction of the magnetic head shown in FIG. 15.

The essential construction of a magnetic head 25 shown in FIGS. 15 and 16 is similar that of the magnetic head 10 of the first embodiment, except that the leading end 15a of the recording/reproducing element 15 and the region in the neighborhood thereof are slightly concave from the surface of the coating layer 19.

In the case where the magnetic head 25 having the construction is used for the magnetic disk apparatus of contact recording/reproducing system, the coating layer 19 having a higher degree of wear resistance contacts the magnetic disk and contacts the magnetic disk because it projects from the leading end 15a and the region in the neighborhood thereof. The leading end 15a does not contact the magnetic disk. Because the coating layer 19 having a higher wear resistance than the recording/reproducing element 15 and the thin $AlO_x$ film 14 in the neighborhood thereof, the wear speed thereof is slow. Accordingly, it takes long for the coating layer 19 is worn to such an extent that its surface becomes substantially flush with the leading end 15a.

That is, the coating layer 19 prevents the leading end 15a of the recording/reproducing element 15 from being worn.

The magnetic head having the construction in which the leading end 15a and the region in the neighborhood thereof are slightly concave from the surface of the magnetic head 19 can be preferably used as a magnetic head which does not allow the wear of the leading end 15a. It is to be noted that the magnetic spacing between the leading end 15a and the magnetic disk increases by the depth of the concave.

Similarly to the first embodiment, such a construction of the magnetic head 25 can be achieved by etching the peripheral region of the thin $AlO_x$ film 14 composing the medium opposed face 18, then, forming the coating layer 19 having a thickness greater than that of the etched portion in selectively forming the coating layer 19 made of the thin DLC film or the like on the etched portion.

Figure 17:
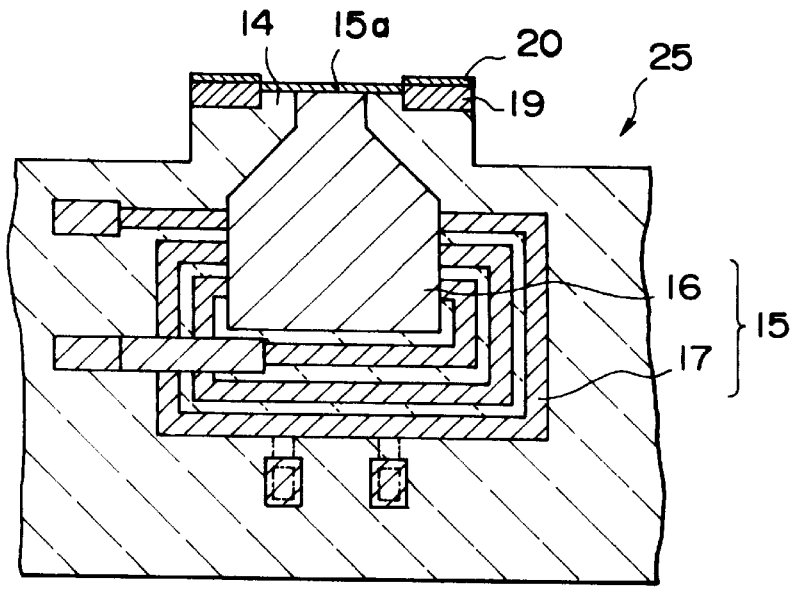
FIG. 17 is a sectional view showing a state in which a second coating layer is formed in the magnetic head shown in FIG. 15.
Figure 18:
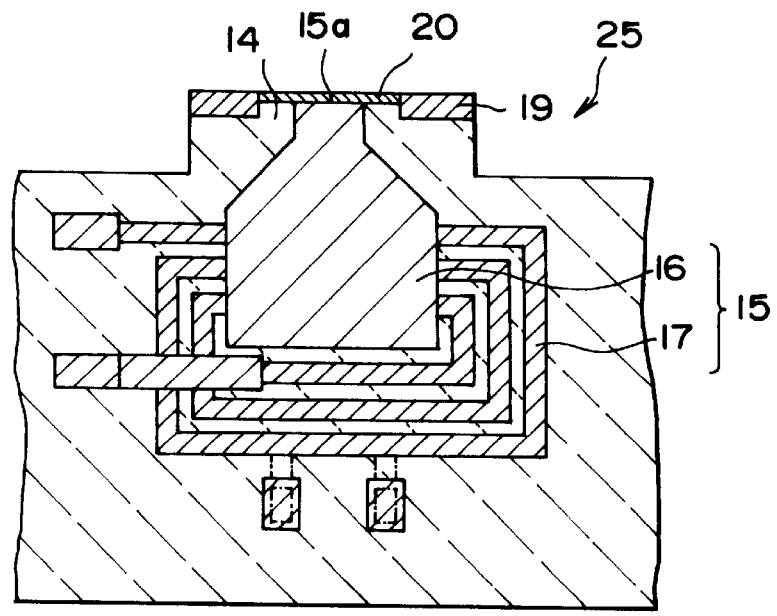
FIG. 18 is a perspective view showing a modification of the magnetic head shown in FIG. 17.

As shown in FIG. 17, in the construction in which the leading end 15a and the region in the neighborhood thereof are slightly concave from the surface of the magnetic head 19, the second coating layer 20 can be formed on the coating layer 19. It is also possible to selectively form the second coating layer 20 on only the leading end 15a and the region in the neighborhood thereof concave from the surface of the coating layer 19. The construction shown in FIG. 18 can be obtained by abrading off the projected portion of the second coating layer 20 from the coating layer 19.

In the manufacturing process of the second and third embodiments, the dishing of the leading end 15a can be effectively prevented.

Then, the outline of the construction of the magnetic disk apparatus using the magnetic head of the present invention will be described below with reference to FIG. 19.

Figure 19:
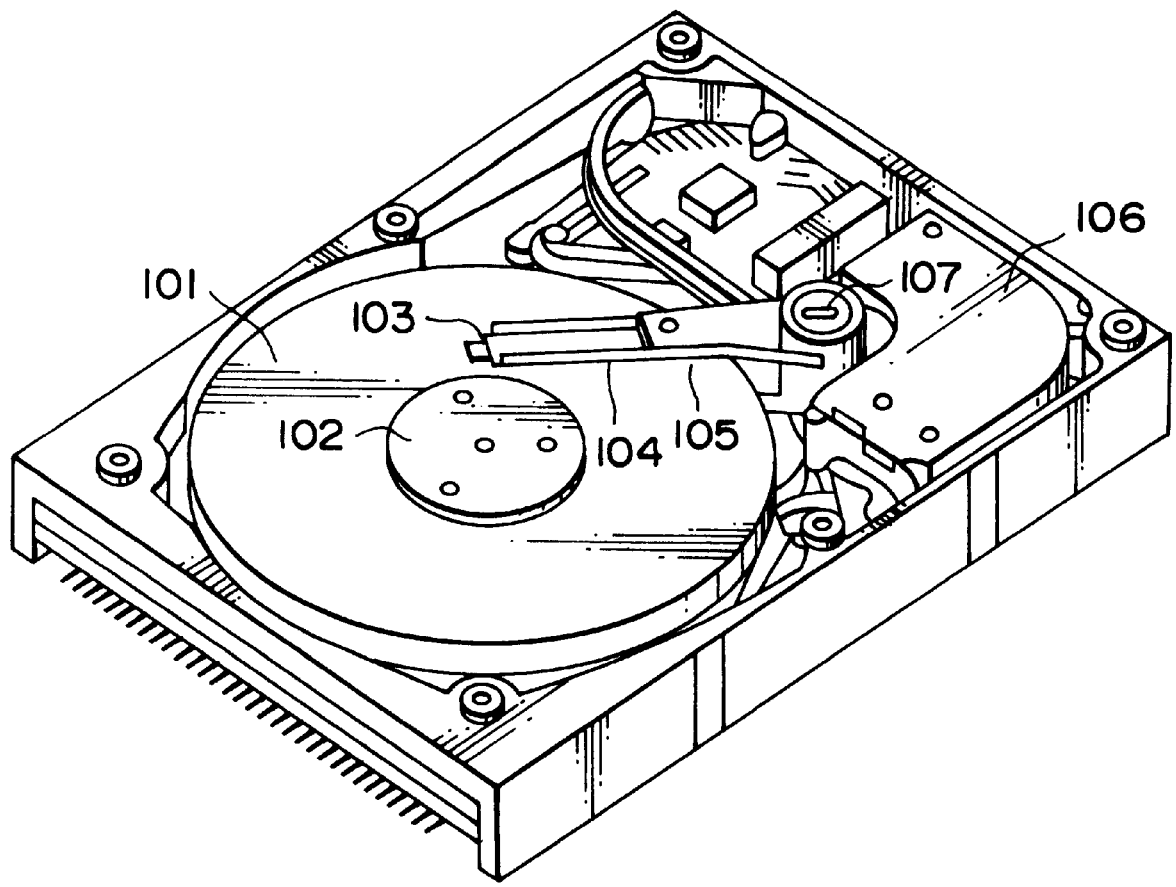
FIG. 19 is a perspective view showing an example of a schematic construction of a magnetic disk apparatus using the magnetic head of the present invention.
Figure 20:
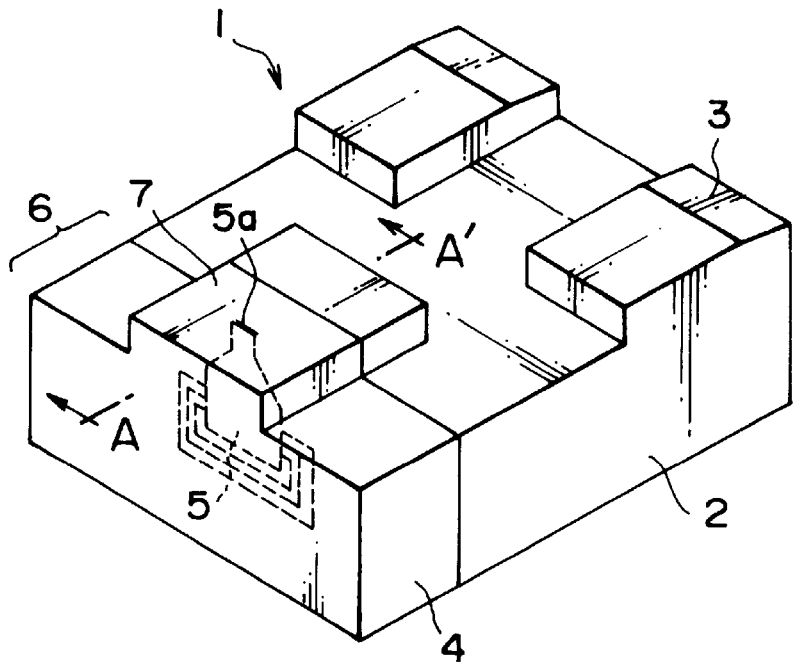
FIG. 20 is a perspective view showing an example of a conventional magnetic head.
Figure 21:
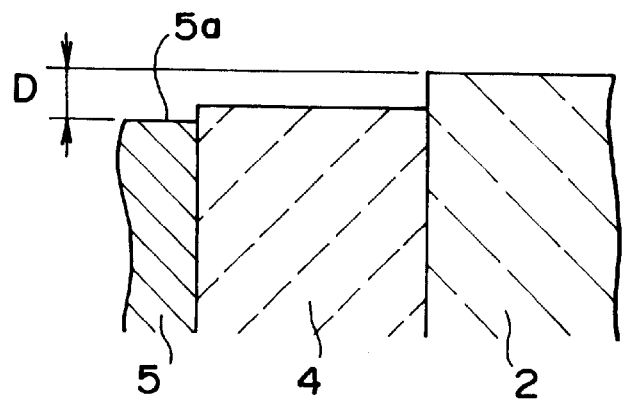
FIG. 21 is a view for describing dishing at the leading end of a recording/reproducing element of the conventional magnetic head shown in FIG. 20.

FIG. 19 is a view showing the outline of the magnetic disk apparatus using a rotary actuator. A magnetic disk 101 is installed on a spindle 102, thus rotating at a predetermined number of rotations. A head slider 103 has an information-recording/reproducing electromagnetic portion. A head slider 103 which is flying above the magnetic disk 101 is installed on the front end of a suspension 104 made of a thin film. The head slider 103 is constructed of any of the magnetic heads 10, 24, and 25 of the embodiments.

The suspension 104 is connected with one end of an actuator arm 105 having a bobbin holding a driving coil not shown in FIG. 19. A voice coil motor 106 which is a kind of a linear motor is installed on the other end of the actuator arm 105.

The voice coil motor 106 comprises the driving coil wound around the bobbin of the actuator arm 105; and a magnetic circuit having a permanent magnet and a yoke opposed to the permanent magnet and sandwiching the driving coil between it and the permanent magnet. The actuator arm 105 is held by a ball bearing (not shown)

installed on upper and lower portions of a shaft 107. The voice coil motor 106 pivots the actuator arm 105 slidably on the magnetic disk 101.

The magnetic head of the present invention allows the magnetic recording density of the magnetic disk apparatus to be enhanced, thus allowing the magnetic disk apparatus to have a large capacity and reliability.

As apparent from the description of the embodiment, in the magnetic head of the present invention, even in the case where it is applied to a magnetic disk apparatus of contact recording/reproducing system, the wear amount of the leading end of the recording/reproducing element and that of the region in the neighborhood thereof can be reduced greatly. In addition, it is possible to restrain the generation of the thermal asperity and the deterioration of the characteristic of the magnetoresistance effect film by preventing the temperature rise of a portion of the magnetoresistance effect film. Further, the magnetic spacing between the magnetic head and the magnetic disk can be reduced by preventing the dishing the leading end of the recording/reproducing element. Owing to these advantages, the characteristic and reliability of the magnetic head can be enhanced.

Although the present invention has been shown and described with respect to a best mode embodiment thereof, it should be understood by those skilled in the art that the foregoing and various other changes, omission, and additions in the form and detail thereof may be made therein without departing from the spirit and scope of the present invention.

What is claimed is:

1. A magnetic head for writing signals to a recording medium by a magnetic field and reading signals by a magnetic field generated by magnetic information of the recording medium, by bringing a medium opposed face into contact with the recording medium or by flying the medium opposed face above the recording medium, comprising:

an insulation layer having the medium opposed face;

a recording/reproducing element having a leading end and embedded in the insulation layer, the leading end being exposed and surrounded by the insulation layer at the medium opposed face to form a first region; and a high-hardness coating layer disposed on a peripheral region of the medium opposed face other than the first region including the leading end of the recording/reproducing element and having a hardness higher than a hardness of the insulation layer.

2. The magnetic head as set forth in claim 1, wherein said high-hardness coating layer has a thermal conductivity higher than a thermal conductivity of said insulation layer.

3. The magnetic head as set forth in claim 1,
   wherein said high-hardness coating layer has a Vickers hardness of 800 Hv or more.

4. The magnetic head as set forth in claim 1,
   wherein said high-hardness coating layer is made of at least one substance selected from the group consisting of diamond-like carbon, aluminum nitride, silicon nitride, silicon carbide, and zirconium oxide.

5. The magnetic head as set forth in claim 1,
   wherein said high-hardness coating layer is made of diamond-like carbon.

6. The magnetic head as set forth in claim 1,
   wherein 98% or more of an area of said medium opposed face is covered with said high-hardness coating layer.

7. The magnetic head as set forth in claim 1,
   wherein said high-hardness coating layer is positioned so that the surface of said high-hardness coating layer and said leading end of said recording/reproducing element substantially form the same plane.

8. The magnetic head as set forth in claim 1,
   wherein said recording/reproducing element has a magnetoresistance effect element serving as a reproducing element.

9. A magnetic head for writing signals to a recording medium by a magnetic field and reading signals by a magnetic field generated by magnetic information of said recording medium, by bringing a medium opposed face into contact with said recording medium or by flying said medium opposed face above said recording medium, comprising:

an insulation layer having said medium opposed face;

a recording/reproducing element having a leading end and embedded in said insulation layer, said leading end being exposed and surrounded by the insulation layer at said medium opposed face to form a first region; and a high-thermal conductivity coating layer disposed on a peripheral region of said medium opposed face other than the first region including said leading end of said recording/reproducing element and having a thermal conductivity higher than a thermal conductivity of said insulation layer.

10. The magnetic head as set forth in claim 9,
    wherein said high-thermal conductivity coating layer has a thermal conductivity of 20 W/m K or more.

11. The magnetic head as set forth in claim 9,
    wherein said high-thermal conductivity coating layer is made of at least one substance selected from the group consisting of diamond-like carbon, aluminum nitride, silicon nitride, and silicon carbide.

12. The magnetic head as set forth in claim 9,
    wherein an entire surface of said medium opposed face including a surface of said high-thermal conductivity coating layer is coated with another high-thermal conductivity coating layer having a thermal conductivity higher than the thermal conductivity of said insulation layer.

13. The magnetic head as set forth in claim 9,
    wherein said recording/reproducing element has a magnetoresistance effect element serving as a reproducing element.

14. A method of manufacturing a magnetic head for writing signals to a recording medium by a magnetic field and reading signals by a magnetic field generated by magnetic information of the recording medium, by bringing a medium opposed face into contact with the recording medium or by flying the medium opposed face above the recording medium, comprising the steps of:

embedding a recording/reproducing element in an insulation layer having said medium opposed face so that a leading end of said recording/reproducing element is positioned at said medium opposed face;

etching a peripheral region of said medium opposed face other than a region in the neighborhood of said leading end of said recoding/reproducing element, the region in the neighborhood comprising said leading end and an insulation layer portion surrounding the leading end;

forming a high-hardness coating layer having a hardness higher than a hardness of said insulation layer on an etched portion; and finishing a surface of said leading end of said recording/reproducing element and the region in the neighborhood by wear to form a plane.

15. The method as set forth in claim 14, wherein said high-hardness coating layer has a thermal conductivity higher than a thermal conductivity of said insulation layer.

16. The method as set forth in claim 14, wherein the finishing processing by means of wear is performed by pressing said region in the neighborhood of said projected leading end of said recording/reproducing element against a processing disk having a film of diamond-like carbon formed thereon.

17. The method as set forth in claim 14, further comprising forming another high-hardness coating layer having a hardness higher than the hardness of said insulation layer on an entire surface of said medium opposed face including said leading end of said recording/reproducing element subjected to said finish processing and said region in the neighborhood thereof subjected to said finishing processing.

18. A magnetic head for writing signals to a recording medium by a magnetic field and reading signals by a magnetic field generated by magnetic information of the recording medium, by bringing a medium opposed face into contact with the recording medium or by flying the medium opposed face above the recording medium, comprising:

an insulation layer having a first surface facing the medium;

a recording/reproducing element having a leading end and embedded in the insulation layer, the leading end being surrounded by the insulation layer at the first surface facing the medium to form a first region;

a first high-hardness coating layer disposed on a second region of the first surface facing the medium other than a first region including the leading end of the recording/reproducing element and having a hardness higher than a hardness of the insulation layer, and a second high hardness coating layer disposed on an entire surface of the first region and the first high-hardness coating layer and having the medium opposed face, the second high hardness coating layer having a hardness higher than the hardness of the insulation layer.

19. The magnetic head as set forth in claim 18, wherein said first and second high-hardness coating layers have a thermal conductivity higher than a thermal conductivity of said insulation layer.

20. The magnetic head as set forth in claim 18, wherein said first and second high-hardness coating layers have a Vickers hardness of 800 Hv or more.

21. The magnetic head as set forth in claim 18, wherein said first and second high-hardness coating layers are made of at least one substance selected from the group consisting of diamond-like carbon, aluminum nitride, silicon nitride, silicon carbide, and zirconium oxide.

22. The magnetic head as set forth in claim 18, wherein said first and second high-hardness coating layers are made of diamond-like carbon.

23. The magnetic head as set forth in claim 18, wherein said first high-hardness coating layer is positioned so that the surface of said first high-hardness coating layer and said leading end of said recording/reproducing element substantially form the same plane.

* * * * *